Patented Nov. 7, 1922.

1,434,498

UNITED STATES PATENT OFFICE.

CARL S. MINER, OF CHICAGO, ILLINOIS, ASSIGNOR TO THE QUAKER OATS COMPANY, OF CHICAGO, ILLINOIS, A CORPORATION OF NEW JERSEY.

FOOD PRODUCT.

No Drawing.   Application filed October 22, 1920. Serial No. 418,738.

*To all whom it may concern:*

Be it known that I, CARL S. MINER, a citizen of the United States, residing at Chicago, in the county of Cook and State of Illinois, have invented new and useful Improvements in Food Products, of which the following is a full, clear, concise, and exact description.

My invention relates to food products and the process of manufacturing them, and it refers specially to those having a desirable nutritive value and which may be produced in large quantities and of uniform quality so as to be economically merchandised.

More particularly, my invention relates to food products that may be preserved without deterioration in merchandising packages of the usual form and that comprise milk products which impart thereto the necessary vitamine, lime and complete protein constituents that are recognized as being required in a well balanced diet. Heretofore, it has been impracticable to comprise milk products having an appreciable butter-fat content and, therefore, the desired vitamine constituent known as fat soluble A, in food compositions of the character designated above because of the tendency of the butter-fat content therein to deteriorate and become rancid whereby the quality of the food product, as a whole, is impaired.

By my present invention, I am able to manufacture food compositions, for example, those food products known in the trade as alimentary pastes, which contain milk or milk products having an appreciable butter-fat content and in which the tendency of the butter fat to become rancid is eliminated. Therefore, I am able to procure by my present method food products embodying the desirable characteristics indicated above which are permanently palatable and, as a result thereof, capable of being widely merchandised.

It is known that rancidification of certain types of fats and oils, and particularly butter-fat which possesses a very pronounced tendency to become rancid, is produced by the action of light, heat and moisture. In my Patent No. 1,349,524 entitled Alimentary paste, I have described a food product comprising whole milk products in which rancidification of the butter-fat content therein is prevented by a careful proportioning of the percentage of the butter-fat constituent to the percentage of the cereal constituent so that the butter-fat will be substantially occluded or enveloped within the cereal paste thereby protecting the butter-fat globules from the rancid producing action of air, light and moisture.

In this present invention, I disclose an improved process of manufacturing food compositions, and particularly as it pertains to the manufacture of alimentary pastes, such as macaroni, spaghetti, vermicelli, noodles and the like, that comprise milk products. By my present process I am able to produce a nutritively well balanced food product comprising an appreciable butter-fat content having permanent keeping qualities in which relatively coarse particles of milk products containing a large percentage of butter-fat are occluded or enveloped with-in a cereal paste mass which protects the butter-fat globules from air and moisture. By reason of the physical nature of the milk products which I embody in my present food composition, I am able to effectively protect the butter-fat which may be present in relatively large quantities, from rancidifying. In this fashion, I produce a permanent keeping food product that comprises a butter-fat content in a larger proportion than has heretofore been possible.

I propose to use milk products having certain physical forms and mixing these milk products with the various other ingredients of the food composition in a particular manner so as to substantially preclude the butter-fat content of the milk products from being subjected to the rancidifying action of air and moisture in the finished product. I so modify the ordinary process of manufacturing food products of the above indicated character, that the milk products comprising the butter-fat globules will be present in the completed food product in particles of as large a size as is compatible with a satisfactory texture and flavor of the food product, which qualities are requisites in such merchantable food products.

Heretofore, in the manufacture of alimentary food compositions comprising a milk product, such as milk macaroni, a desiccated milk product was dissolved in a suitable amount of water and this solution of milk solids was then added to the semolina or other cereal. The ordinary process of manufacturing alimentary paste is then followed from this point. In this manner the milk products were thoroughly disseminated through the finished food product in the highest possible state of dispersion or, in other words, in the finest possible state of subdivision by reason of the complete solution of the milk product particles. The foregoing was the only way of manufacturing food products of this type and is the natural method of making alimentary paste products of the character indicated.

In my present process of manufacturing food products, the milk products in the finished food composition are present in such physical form that they exist as particles of the largest size compatible with the satisfactory quality, texture and flavor of the finished product. It will, therefore, be observed that I endeavor to secure a diametrically opposite result from that obtained by the heretofore employed method, inasmuch as I preclude the milk products from being disseminated through the finished product in the finest possible state of subdivision.

One of the methods which I may follow by my present process of manufacturing an alimentary paste product is as follows: I take semolina, which is a coarsely ground wheat product, and mix with it a desiccated milk product in the form of comparatively large particles that are preferably somewhat larger than the particles of the semolina. To this mixture I add the necessary amount of water for reducing the mixture to the proper doughy consistency. I mix the dough very rapidly and completely finish the mixing thereof before the solution of the particles of desiccated milk product is even approximately complete. Under the foregoing circumstance, the milk-product particles dissolve very slowly. Having the mixture thus completed before the complete dissemination of the milk product particles throughout the body of the paste in a fine state of subdivision I then proceed to manufacture the food products in the usual way.

Another method by which I may practice the process of my present invention is to first add the requisite water to the semolina and then mix to a dough of the proper consistency. To this dough I then add the desiccated milk product having the form of large particles and preferably somewhat larger than the particles of the semolina. I subsequently mix this combination so as to disseminate the milk-product particles throughout the body of the paste. It is to be understood, however, that this mixing process does not proceed to the point where the milk-product particles are substantially dissolved or so thoroughly disseminated that they will be in a fine state of subdivision. In this manner, I am able to insert milk product particles having a substantial butter-fat content in a food composition, the milk product particles being of such size that they severally contain a substantial butter-fat content and, at the same time, have a relatively small exposed surface in contact with the enveloping paste or dough formed by the cereal paste. In this fashion, I protect the butter-fat content of the milk product particles from the rancidifying action of light, air and moisture. It is to be noted that I secure this result by using a milk product in the form of relatively large particles and disseminating these particles throughout the body of the paste in such a manner that the particles are not appreciably dissolved but completely occluded by the associated paste.

As a result of my process, as explained above, I am able to produce an alimentary paste product, and particularly milk macaroni, comprising milk solids having an appreciable butter-fat content which milk solids will be present in the finished product in a coarse state of subdivision. Naturally all of the factors which tend to decrease solubility, as for example, the use of water of low temperature, or the use of a milk product having a low solubility may be made use of when following my process of manufacturing alimentary paste products containing milk solids.

Again, it is apparent that in addition to the desiccated milk products of the usual form, I may employ desiccated buttermilk as one of the constituents of the food product of my present invention.

From the foregoing it will be appreciated that I am able to produce food products of permanent-keeping quality that comprise in appreciable proportions those dietetic constituents, such as whole protein, lime, butter-fat and vitamine constituents that are desired in a nutritively well balanced product.

While I have described in detail a process by which my invention may be practiced it is to be understood that I desire only such limitations to be imposed upon my invention as are set forth in the appended claims.

Having thus described my invention what I now claim as new and desire to secure by Letters Patent is:

1. An alimentary paste food composition having permanent keeping qualities which comprises a cereal paste content and a milk product having a butter-fat content, said milk product being disseminated in said alimentary paste food composition in the form of undissolved coarse particles which are completely enveloped by said cereal paste content to form a protective coating for the milk particles.

2. A food composition having permanent keeping qualities which comprises a cereal and a whole milk product having a substantial butter-fat content, said milk product being present in the form of undissolved particles that are coarse relative to those comprising the cereal constituent to form a texture compatible with apparent homogeneity of the food composition.

3. A food composition of permanent keeping qualities which comprises a milk product and a cereal, said milk product being disseminated in said food composition in the form of undissolved coarse particles.

4. An alimentary paste food product of permanent keeping qualities comprising a cereal and desiccated milk having a substantial butter fat content, said milk product being the in the form of coarse particles that are disseminated in said food product without having been substantially dissolved therein.

5. A milk macaroni comprising a cereal ingredient and a desiccated milk ingredient, the latter being disseminated therein in the form of coarse particles that are substantially completely enveloped by the cereal ingredient to substantially preclude said coarse particles from being dissolved by other ingredients.

6. The process of manufacturing an alimentary paste food product comprising a milk containing ingredients which consists in combining the cereal ingredient with a milk product in the form of coarse particles and then rapidly disseminating said milk particle throughout the composite dough mixture in order that they may be severally substantially completely enveloped by the dough before appreciable solution of said milk particles is effected.

7. The process of manufacturing a milk macaroni which consists in adding to the initial dough mixture a desiccated milk product in the form of relatively coarse particles and then controlling the mixing of the resulting dough so as to cause the desiccated milk particles to occur in the finished macaroni in the coarsest state of subdivision compatible with palatability of the milk macaroni.

In witness whereof, I have hereunto subscribed my name.

CARL S. MINER.

Witnesses:
BLANCHE MARSALEK,
FLORENCE MARTIN.